United States Patent
Kishimoto et al.

(10) Patent No.: US 9,639,784 B2
(45) Date of Patent: May 2, 2017

(54) PRINTING APPARATUS, METHOD FOR CONTROLLING THE SAME, AND STORAGE MEDIUM

(71) Applicant: CANON KABUSHIKI KAISHA, Tokyo (JP)

(72) Inventors: Norihisa Kishimoto, Kawasaki (JP); Minoru Fujisawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/874,174

(22) Filed: Oct. 2, 2015

(65) Prior Publication Data

US 2016/0098235 A1  Apr. 7, 2016

(30) Foreign Application Priority Data

Oct. 7, 2014 (JP) .................................. 2014-206740

(51) Int. Cl.
| | |
|---|---|
| H04N 1/00 | (2006.01) |
| G06K 15/02 | (2006.01) |
| G06F 3/12 | (2006.01) |

(52) U.S. Cl.
CPC ......... *G06K 15/02* (2013.01); *H04N 1/00127* (2013.01); *H04N 1/00204* (2013.01); *H04N 1/00212* (2013.01); *H04N 1/00225* (2013.01); *H04N 1/00228* (2013.01)

(58) Field of Classification Search
None
See application file for complete search history.

(56) References Cited

U.S. PATENT DOCUMENTS

| | | | | |
|---|---|---|---|---|
| 5,774,654 A | * | 6/1998 | Maki ................. | H04N 1/32797 340/2.71 |
| 2004/0100562 A1 | * | 5/2004 | Ichikawa ........... | H04N 5/23203 348/211.1 |
| 2004/0169893 A1 | * | 9/2004 | Lee ........................ | H04N 1/327 358/400 |
| 2006/0109813 A1 | * | 5/2006 | Saito ..................... | H04W 28/16 370/329 |
| 2007/0162617 A1 | * | 7/2007 | Bates ................. | H04N 1/00795 709/247 |
| 2009/0156227 A1 | * | 6/2009 | Frerking .............. | H04B 7/0691 455/455 |
| 2009/0310663 A1 | * | 12/2009 | Menon ................. | H04L 43/026 375/225 |
| 2013/0262705 A1 | * | 10/2013 | Imai ..................... | H04L 65/602 709/247 |

FOREIGN PATENT DOCUMENTS

JP  2012-95098 A  5/2012

* cited by examiner

*Primary Examiner* — Beniyam Menberu
(74) *Attorney, Agent, or Firm* — Canon USA Inc., IP Division

(57) ABSTRACT

A printing apparatus measures a communication environment between the printing apparatus and a server. Then, based on the measured communication environment, the printing apparatus selects whether to transmit a scan image to a server by using a multi-connection communication function or to transmit the scan image to the server without using the multi-connection communication function.

7 Claims, 7 Drawing Sheets

UPLOAD SCREEN 500

FIG. 6

| TRANSMISSION RATE | NUMBER OF CONNECTIONS |
|---|---|
| 512 KBYTES/SEC OR HIGHER, 102400 KBYTES/SEC OR LOWER | 3 |
| LOWER THAN 512 KBYTES/SEC | 5 |

TABLE 600

FIG. 7

| DATA SIZE | NUMBER OF CONNECTIONS |
|---|---|
| LESS THAN 100 MBYTES | 1 |
| 100 MBYTES OR LARGER, LESS THAN 1 GBYTES | 3 |
| 1 GBYTES OR LARGER | 5 |

TABLE 700

PRINTING APPARATUS, METHOD FOR CONTROLLING THE SAME, AND STORAGE MEDIUM

BACKGROUND OF THE INVENTION

Field of the Invention

The present invention relates to a printing apparatus having a multi-connection communication function, a method for controlling the printing apparatus, and a storage medium.

Description of the Related Art

With Hypertext Transfer Protocol (HTTP), an information processing apparatus establishes one connection with a server, and performs data communication with the server. To perform this data communication more efficiently, a technique is known in which a plurality of connections is established between the information processing apparatus and the server, and a plurality of data blocks is transmitted and received by using the plurality of the connections. Hereinafter, transmission and reception of data blocks by using a plurality of connections is referred to as multi-connection communication.

Performing multi-connection communication enables using a plurality of connections in parallel and therefore achieves more efficient data communication than with data communication by using one connection. Japanese Patent Application Laid-Open No. 2012-95098 discusses a technique in which an information processing apparatus notifies a server of the maximum number of connections, and the server communicates with the information processing apparatus according to the maximum number of the notified connections.

However, performing multi-connection communication does not necessarily improve the efficiency of data communication depending on a communication environment. In transmitting data by using multi-connection communication, process to divide data occurs. In receiving data by using multi-connection communication, processing for combining the divided data occurs. For example, with a sufficiently high data transmission rate, in consideration of the time required for the division processing and the combination processing, not to perform multi-connection communication may achieve higher efficiency of data communication.

SUMMARY OF THE INVENTION

The present invention is directed to a printing apparatus and a control method for controlling the printing apparatus, capable of selecting whether to perform multi-connection communication according to a communication environment.

According to an aspect of the present invention, a printing apparatus having a multi-connection communication function for transmitting and receiving data blocks by using a plurality of connections, includes a reading unit configured to read a document to generate image data, a measurement unit configured to measure a communication environment between the printing apparatus and an external apparatus, a determination unit configured to determine whether to use the multi-connection communication function based on the communication environment measured by the measurement unit, and a communication unit configured to transmit the image data generated by the reading unit to the external apparatus by using the multi-connection communication function in a case where the determination unit determines to use the multi-connection communication function, and to transmit the image data generated by the reading unit to the external apparatus without using the multi-connection communication function in a case where the determination unit determines not to use the multi-connection communication function.

Further features of the present invention will become apparent from the following description of exemplary embodiments with reference to the attached drawings.

BRIEF DESCRIPTION OF THE DRAWINGS

FIG. 6 illustrates a table for determining the number of HTTP connections.

FIG. 7 illustrates a table for determining the number of HTTP connections.

DESCRIPTION OF THE EMBODIMENTS

Exemplary embodiments of the present invention will be described below with reference to the accompanying drawings. The following exemplary embodiments are not intended to limit the present invention relating to the appended claims. Not all of the combinations of the features described in the exemplary embodiments are indispensable to the solutions of the present invention.

Figure 1:
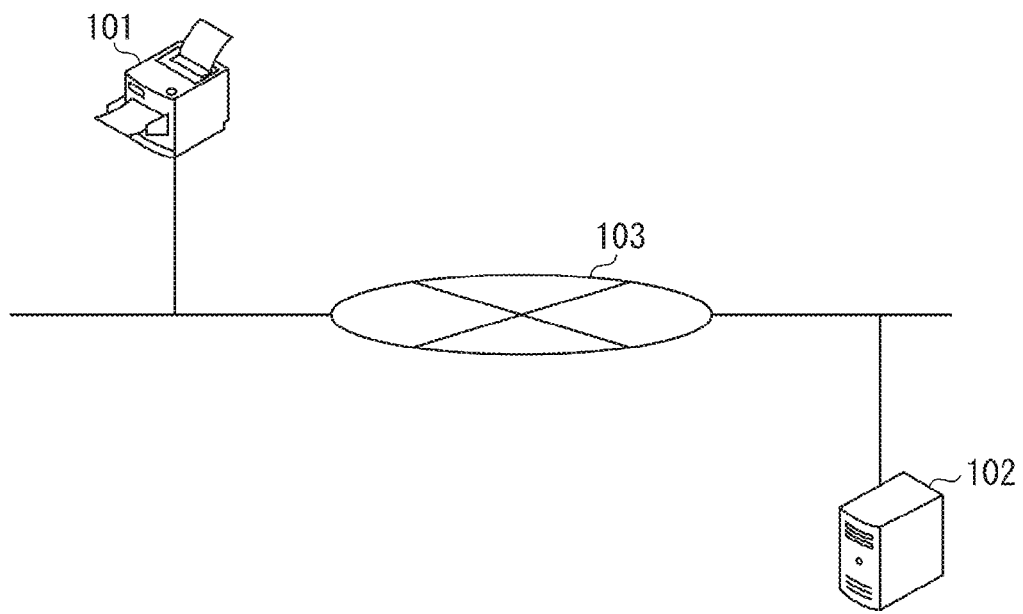
FIG. 1 illustrates an entire system.

A configuration of an information processing system according to a first exemplary embodiment will be described below with reference to FIG. 1. The information processing system according to the present exemplary embodiment includes an information processing apparatus 101 and a server 102. The information processing apparatus 101 and the server 102 are connected with each other via a network 103 so that they can communicate with each other.

Figure 2:
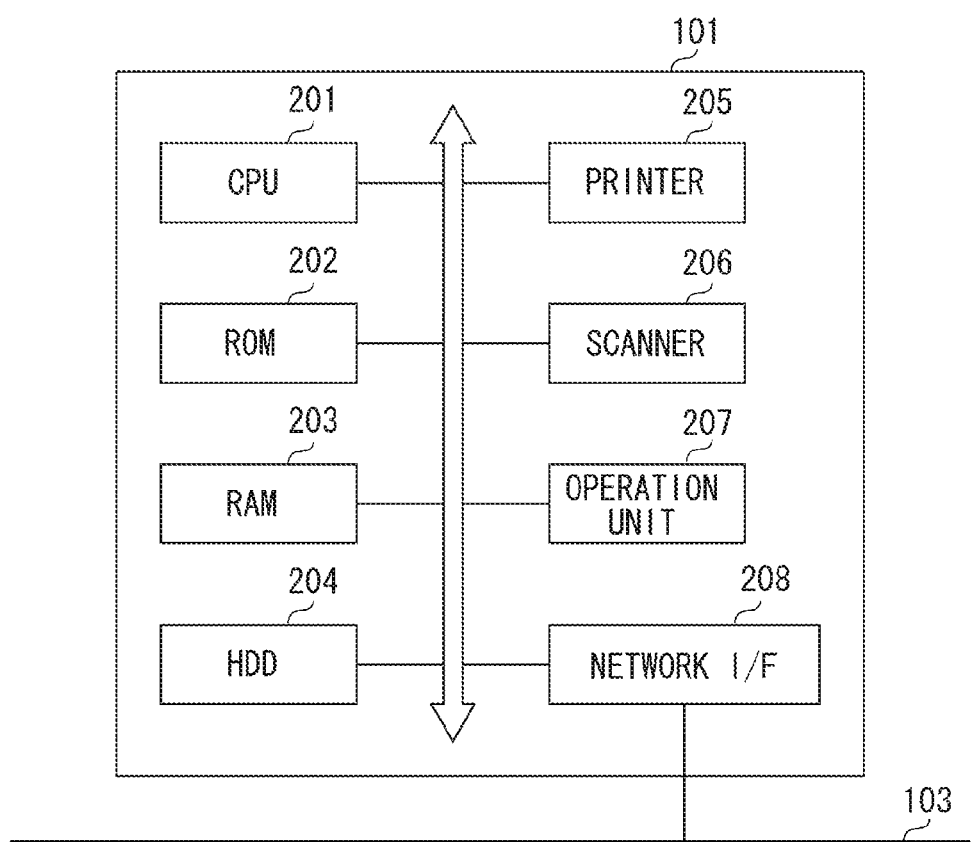
FIG. 2 is a block diagram illustrating a configuration of an information processing apparatus.

A hardware configuration of the information processing apparatus 101 will be described below with reference to FIG. 2. The information processing apparatus 101 is a printing apparatus provided with a copy function, a print function, a scanner function, and a transmission function. Although, in the present exemplary embodiment, a printing apparatus is described as an example of the information processing apparatus 101, the information processing apparatus 101 is not limited thereto, and may be any apparatus (e.g., a personal computer (PC), a mobile phone, a smart phone, etc.) capable of communicating with the server 102.

A central processing unit (CPU) 201 reads a control program stored in a read only memory (ROM) 202 and executes it to control operations of the entire information processing apparatus 101. A random access memory (RAM) 203 is used as a main memory for the CPU 201 and as a temporary storage area such as a work area. A hard disk drive (HDD) 204 stores various data such as font data, emulation programs, and form data.

Although, in the case of the information processing apparatus 101, one CPU 201 performs processing illustrated in flowcharts (described below), other configurations are also applicable. For example, the information processing apparatus 101 may be configured so that a plurality of CPUs performs processing illustrated in the flowcharts (described below) in a collaborative way.

A printer 205 performs print processing based on a print job and a scan image generated by a scanner 206. The scanner 206 reads a document to generate image data (a scan image). An operation unit 207 is provided with a liquid crystal display (LCD) having a touch-panel function, and a keyboard. A user is able to input operations and instructions for the information processing apparatus 101 via the operation unit 207. A network interface (I/F) 208 communicates with an external apparatus such as the server 102 via the network 103.

When transmitting certain data to the server 102, the information processing apparatus 101 is able to establish a plurality of connections (HTTP connections) with the server 102, and transmit data by using the plurality of connections. In this case, the information processing apparatus 101 divides transmission target data into data blocks having a predetermined size, and transmits the data blocks in parallel to the server 102 by using a plurality of the connections. The server 102 is able to combine the received data blocks into the original data. Further, when acquiring certain data from the server 102, the information processing apparatus 101 is able to establish a plurality of connections with the server 102, and acquire the relevant data by using the plurality of connections.

Hereinafter, a communication method for transmitting and receiving data blocks by using a plurality of connections in this way is referred to as multi-connection communication. Multi-connection communication enables using a plurality of connections in parallel and therefore achieves more efficient communication than with data communication using one connection.

Figure 3:
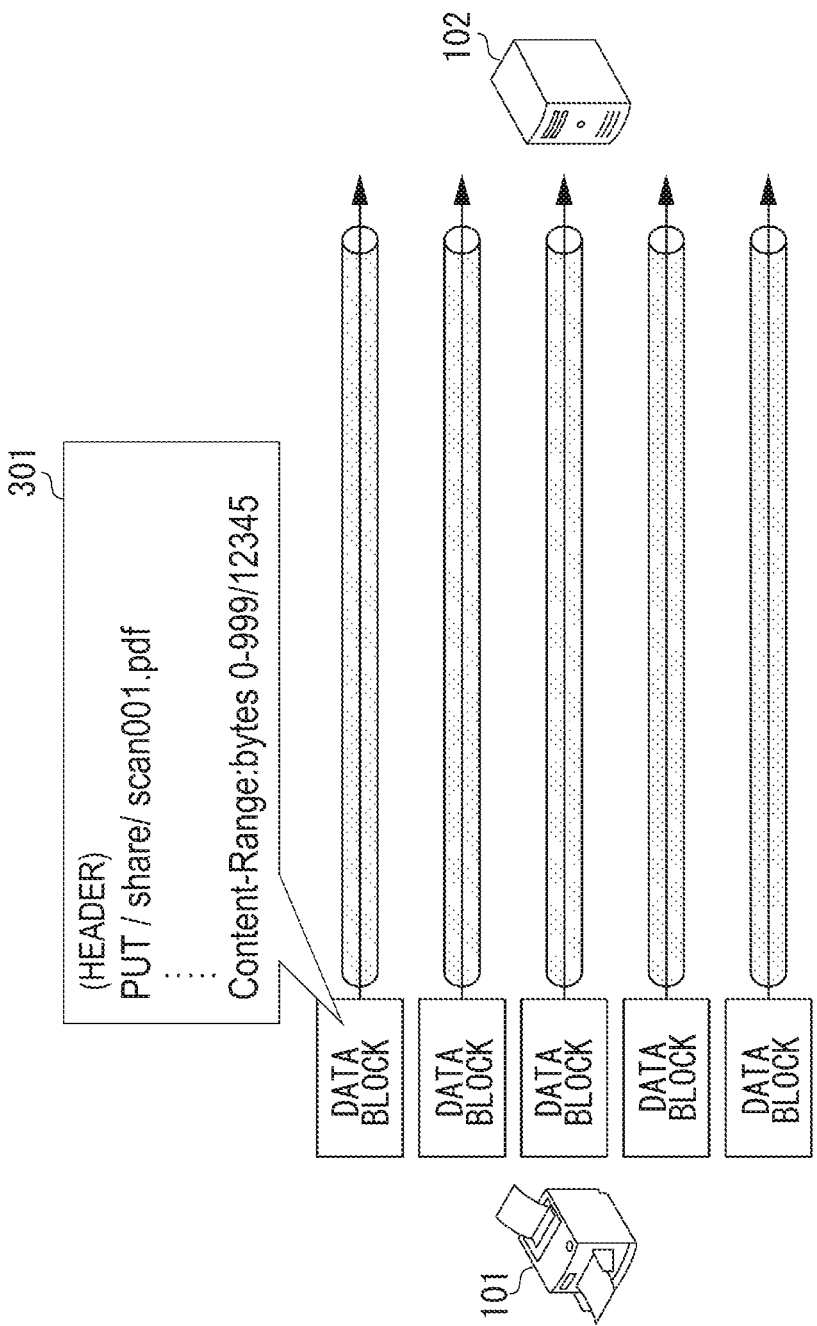
FIG. 3 illustrates multi-connection communication.

Multi-connection communication will be described in more detail below with reference to FIG. 3. FIG. 3 illustrates a case where the scanner 206 of the information processing apparatus 101 uploads a scan image, generated by reading a document, to the server 102 by using multi-connection communication. In the case illustrated in FIG. 3, the information processing apparatus 101 divides the scan image into 5 data blocks and then transmits the data blocks to the server 102 by using 5 HTTP connections.

A header 301 of a packet includes Content-Range information that indicates a range of one data block in bytes in the entire data. The header 301 indicates that the 0th to 999th bytes are to be transmitted as one data block. Upon reception of data blocks, the server 102 is able to combine the data blocks into one piece of original data by referring to the Content-Range information. Although not illustrated in FIG. 3, the Content-Range information is specified in the header of all of the data blocks.

Performing multi-connection communication enables achieving more efficient data communication than with data communication using one connection. However, performing multi-connection communication does not necessarily improve the efficiency of data communication depending on the communication environment. As described above with reference to FIG. 3, when multi-connection communication is performed, processing for dividing data (division processing) occurs on the transmitting side, and processing for combining data (combination processing) occurs on the receiving side. For example, with a sufficiently high data transmission rate in communication between the information processing apparatus 101 and the server 102, in consideration of the time required for the division processing and the combination processing, not to perform multi-connection communication may achieve higher efficiency of data communication. The present exemplary embodiment is directed to selecting whether to perform multi-connection communication according to the communication environment between the information processing apparatus 101 and the server 102.

Figure 4:
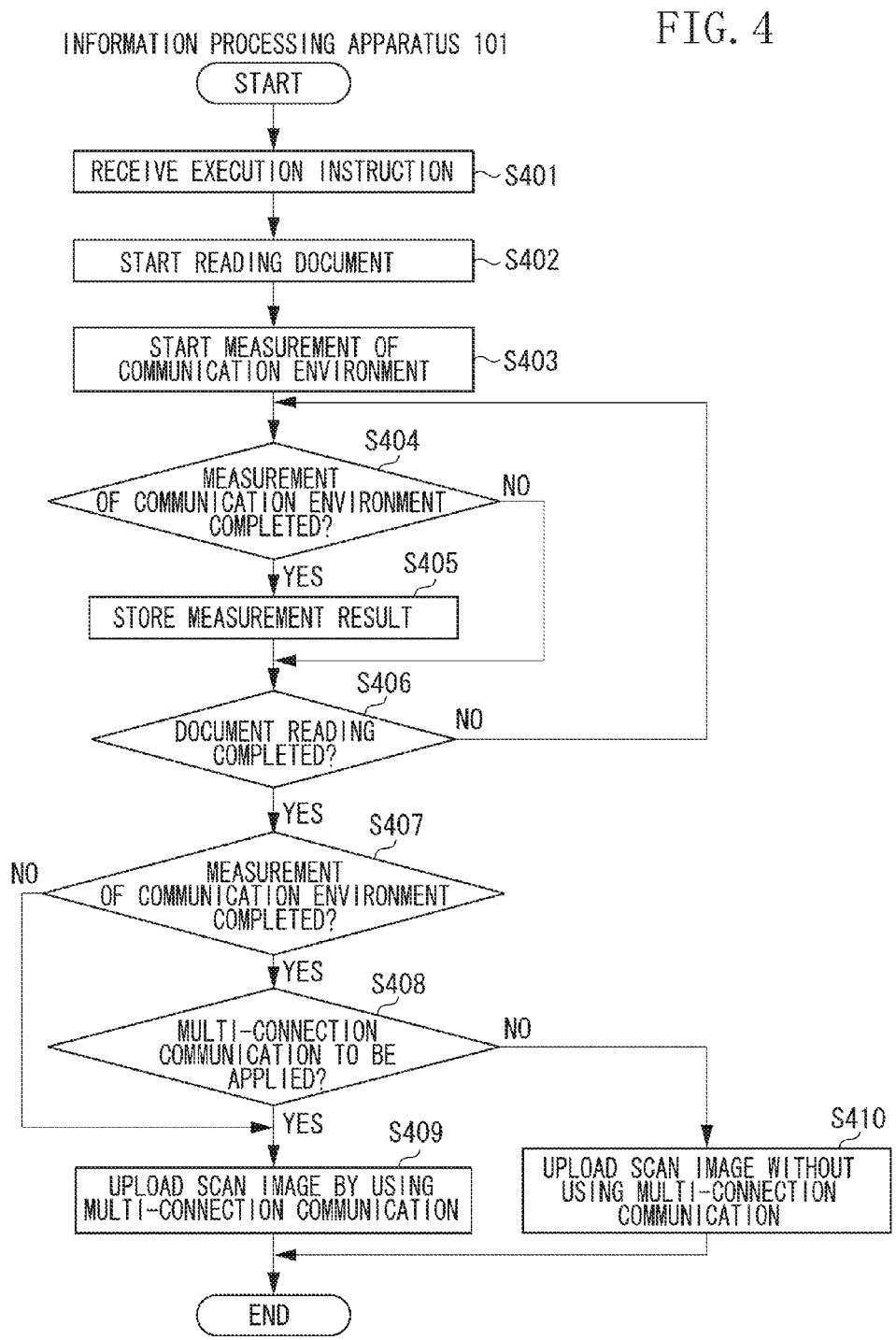
FIG. 4 is a flowchart illustrating processing according to a first exemplary embodiment.

Processing performed by the information processing apparatus 101 to upload a scan image to the server 102 will be described below with reference to a flowchart illustrated in FIG. 4. Each step illustrated in the flowchart in FIG. 4 is implemented when the CPU 201 loads a program stored in a memory such as the ROM 202 into the RAM 203 and then executes it. As described above, the information processing apparatus 101 is capable of performing multi-connection communication.

In step S401, the CPU 201 receives an execution instruction from the user for uploading a scan image to the server 102.

Figure 5:
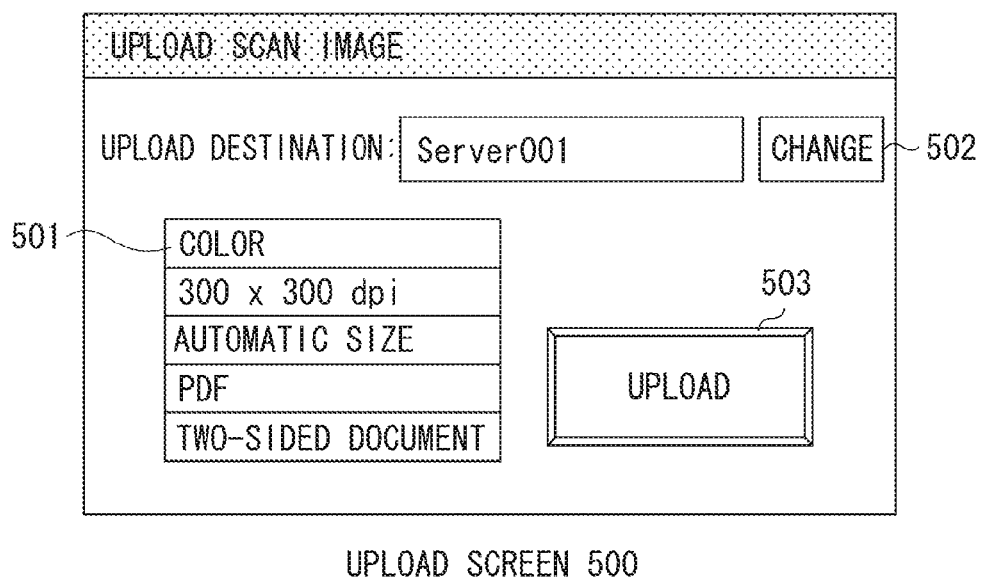
FIG. 5 illustrates an upload screen.

An upload screen 500 illustrated in FIG. 5 is displayed by the operation unit 207, and is used to upload a scan image to a predetermined server. Setting items 501 are used to perform reading setting for document reading. The user is able to select desired items out of the setting items 501 to perform desired reading setting. A Change button 502 is used to change an upload destination. After performing desired reading setting and setting a document on the scanner 206, the user presses (touches) an Upload button 503. In the present exemplary embodiment, when the user presses the Upload button 503, then in step S401, the CPU 201 receives an execution instruction from the user for uploading a scan image to the server 102.

When the CPU 201 receives the execution instruction in step S401, then in step S402, the scanner 206 starts reading a document using the specified setting values. In step S403, the CPU 201 starts the measurement of the communication environment when the scanner 206 starts reading the document. Although the document reading in step S402 and the measurement of the communication environment in step S403 are performed in the order illustrated in FIG. 4, the order is not limited thereto. These steps may be performed in reverse order. An important point is that the document reading and the measurement of the communication environment are performed in parallel.

The measurement of the communication environment will be described in more detail below. In the present exemplary embodiment, the CPU 201 measures, as a communication environment, the transmission rate between the information processing apparatus 101 and the server 102 as a scan image upload destination. The method for measuring the transmission rate may be a well-known technique, and is not limited to any particular method. For example, the transmission rate may be measured based on the time period required from the time when the information processing apparatus 101 transmits a predetermined packet to the server 102 and to the time when it receives a response packet to the transmitted packet, and on the sizes of the transmitted and received packets. Alternatively, the CPU 201 may acquire data dedicated for measuring the transmission rate from the server 102, and measure the transmission rate based on the time taken for the data acquisition and the size of the acquired data. The communication environment measured in the present exemplary embodiment is not limited to the transmission rate. Other factors such as the packet loss rate during data communication and the frequency of the occurrence of data communication may be considered as a communication environment.

Referring back to the flowchart illustrated in FIG. 4, in step S404, the CPU 201 determines whether the measurement of the communication environment is completed. In the present exemplary embodiment, when the measurement of the transmission rate between the information processing apparatus 101 and the server 102 is completed, the CPU 201 determines that the measurement of the communication environment is completed (YES in step S404), and then the processing proceeds to step S405. In step S405, the CPU 201 stores the result of the measurement of the communication environment (the transmission rate between the information processing apparatus 101 and the server 102 in the present exemplary embodiment) in a predetermined storage area of the HDD 204. Then, the processing proceeds to step S406. On the other hand, when the CPU 201 determines that the measurement of the communication environment is not completed (NO in step S404), the processing proceeds to step S406.

In step S406, the CPU 201 determines whether the document reading with the scanner 206 is completed. When the CPU 201 determines that the document reading with the scanner 206 is not completed (NO in step S406), the processing returns to step S404. Then, the CPU 201 repeats processing in steps S404 to S406 until the document reading is completed. On the other hand, when the CPU 201 determines that the document reading is completed (YES in step S406), the processing proceeds to step S407. In a case where a plurality of documents is set on the scanner 206, when all of the documents have been read by the scanner 206, the CPU 201 determines that the document reading is completed in step S406.

In step S407, the CPU 201 determines whether the measurement of the communication environment is completed. When the measurement of the communication environment started in step S403 is completed (Yes in step S407), the processing proceeds to step S408. On the other hand, when the measurement of the communication environment started in step S403 is not completed (NO in step S407), the processing proceeds to step S409. In the present exemplary embodiment, when the measurement of the communication environment is completed (YES in step S404), then in step S405, the result of the measurement of the communication environment is stored in a predetermined storage area of the HDD 204. In step S407, the CPU 201 confirms whether this information is stored. When the relevant information is stored, the CPU 201 determines that the measurement of the communication environment is completed (YES in step S407). On the other hand, when the relevant information is not stored, the CPU 201 determines that the measurement of the communication environment is not completed (NO in step S407).

Processing performed in step S408 will be described below. In step S408, the CPU 201 determines whether to apply multi-connection communication to the communication for uploading a scan image. In the present exemplary embodiment, the CPU 201 determines whether to apply multi-connection communication based on the result of the measurement of the communication environment stored in the HDD 204. When the result of the measurement of the communication environment (i.e., the transmission rate between the information processing apparatus 101 and the server 102) is higher than a predetermined communication rate (e.g., 102400 Kbytes/sec), the CPU 201 determines not to apply multi-connection communication (NO in step S408), and then, the processing proceeds to step S410. On the other hand, when the result of the measurement of the communication environment (i.e., the transmission rate between the information processing apparatus 101 and the server 102) is equal to or lower than the predetermined communication rate, the CPU 201 determines to apply multi-connection communication (YES in step S408), and then, the processing proceeds to step S409.

Processing performed in step S409 will be described below. In step S409, the CPU 201 controls the network I/F 208 to upload a scan image to the server 102 by using multi-connection communication. The network I/F 208 uploads a scan image to the server 102 by using multi-connection communication. Multi-connection communication is used in step S409 when the transmission rate between the information processing apparatus 101 and the server 102 is equal to or lower than a predetermined communication rate.

Using multi-connection communication enables improving the efficiency of data communication. Further, when the document reading is completed before the measurement of the communication environment is completed (NO in step S407), multi-connection communication is used in step S409. Although, in the present exemplary embodiment, 5 HTTP connections are established as illustrated in FIG. 3 when multi-connection communication is performed, the number of HTTP connections is not limited thereto, and may be 2 or 3.

Processing performed in step S410 will be described below. In step S410, the CPU 201 controls the network I/F 208 to upload a scan image to the server 102 without using multi-connection communication. The network I/F 208 establishes one HTTP connection with the servers 102 and uploads a scan image to the server 102 without using multi-connection communication. The network I/F 208 does not use multi-connection communication in step S410 when the transmission rate between the information processing apparatus 101 and the server 102 is higher than a predetermined communication rate. This case enables shortening the time taken for the data division processing and the data combination processing required for multi-connection communication, thus improving the efficiency of data communication.

As described above, instead of using multi-connection communication, the present exemplary embodiment enables selecting not to use multi-connection communication depending on the communication environment. More specifically, when the transmission rate between the information processing apparatus 101 and the server 102 is higher than a predetermined communication rate, i.e., when a sufficient transmission rate can be ensured, performing data communication without using multi-connection communication enables improving the efficiency of data communication.

Further, according to the present exemplary embodiment, the measurement of the communication environment and the document reading are performed in parallel. Therefore, the time period until the uploading of a scan image is completed can be shortened in comparison with the case where a document is read after the measurement of the communication environment is completed or a case where the communication environment is measured after the document reading is completed.

According to the present exemplary embodiment, when the document reading is previously completed before the measurement of the communication environment is completed, the CPU 201 uploads a scan image by using multi-connection communication without waiting for completion of the measurement of the communication environment. If the measurement of the communication environment is not completed, an inferior communication environment is assumed. Therefore, uploading a scan image by using multi-connection communication enables improving the efficiency of data communication.

A second exemplary embodiment as a modification of the first exemplary embodiment will be described below. In the first exemplary embodiment, when multi-connection communication is determined to be applied in step S408 illustrated in FIG. 4, the network I/F 208 uniformly establishes the same number of HTTP connections. On the other hand, in the present exemplary embodiment, the network I/F 208 determines the number of HTTP connections based on the transmission rate between the information processing apparatus 101 and the server 102.

A table 600 illustrated in FIG. 6 is information stored in the HDD 204. In the present exemplary embodiment, the network I/F 208 determines the number of HTTP connections based on the table 600 and the measurement result stored in step S405, i.e., the transmission rate between the information processing apparatus 101 and the server 102. Thus, instead of performing multi-connection communication by uniformly using the same number of HTTP connections, the network I/F 208 is able to determine the suitable number of HTTP connections according to the transmission rate.

A third exemplary embodiment as a modification of the first exemplary embodiment will be described below. In the first exemplary embodiment, when the CPU 201 determines to apply multi-connection communication in step S408 illustrated in FIG. 4, the network I/F 208 uniformly establishes the same number of HTTP connections. On the other hand, in the present exemplary embodiment, the CPU 201 determines the number of HTTP connections based on the size of data to be transmitted to the server 102.

A table 700 illustrated in FIG. 7 is information stored in the HDD 204. In the present exemplary embodiment, when multi-connection communication is used in step S409, the CPU 201 determines the number of HTTP connections based on the table 700 and the data size of a scan image to be uploaded to the server 102. For example, when the data size of a scan image is 1 Gbyte or larger, the CPU 201 determines the number of HTTP connections as 5.

On the other hand, when the data size of a scan image is smaller than 100 Mbytes, the CPU 201 determines the number of HTTP connections is 1, i.e., the CPU 201 determines not to use multi-connection communication. When small-sized data is transmitted by using multi-connection communication, the communication efficiency is decreased. Therefore, in the present exemplary embodiment, even in a case where the CPU 201 determines to apply multi-connection communication in step S408, the CPU 201 does not apply multi-connection communication because of the small size of data to be transmitted. This enables improving the communication efficiency when small-sized data is transmitted. In other words, according to the present exemplary embodiment, it is possible to select whether to perform multi-connection communication based on the size of data to be transmitted.

A fourth exemplary embodiment as a modification of the first exemplary embodiment will be described below. Although, in the above-described exemplary embodiments, the CPU 201 perform the measurement of the communication environment in step 403 each time data communication occurs between the information processing apparatus 101 and the server 102, other forms are also applicable. For example, when the first data communication occurs, the CPU 201 may measure the communication environment and store the result of the measurement in a memory such as the HDD 204, associating the measurement result with identification information (for example, the IP address of the server 102) indicating the server 102. Then, when the second and subsequent data communication occurs, the CPU 201 may refer to the information stored in a memory such as the HDD 204, and omit the measurement of the communication environment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-206740, filed Oct. 7, 2014, which is hereby incorporated by reference herein in its entirety.

What is claimed is:

1. A printing apparatus having a multi-connection communication function for transmitting and receiving data blocks by using a plurality of connections, the printing apparatus comprising:
   a reading unit configured to read a document to generate image data;
   a measurement unit configured to measure a communication environment between the printing apparatus and an external apparatus;
   a determination unit configured to determine whether to use the multi-connection communication function based on the communication environment measured by the measurement unit; and
   a communication unit configured to transmit the image data generated by the reading unit to the external apparatus by using the multi-connection communication function in a case where the determination unit determines to use the multi-connection communication function, and to transmit the image data generated by the reading unit to the external apparatus without using the multi-connection communication function in a case where the determination unit determines not to use the multi-connection communication function, wherein the document reading by the reading unit and the measurement of the communication environment by the measurement unit are performed in parallel, and in a case where the document reading by the reading unit is completed before the measurement of the communication environment by the measurement unit is completed, the communication unit transmit the image data generated by the reading unit to the external apparatus by using the multi-connection communication function prior to completing the measurement of the communication environment.

2. The printing apparatus according to claim 1, wherein, in a case where the determination unit determines not to use the multi-connection communication function, the communication unit transmits the image data generated by the reading unit to the external apparatus by using one connection.

3. The printing apparatus according to claim 1, further comprising a determination unit configured to determine the number of connections based on the communication environment measured by the measurement unit, wherein, in a case where the determination unit determines to use the multi-connection communication function, the communication unit establishes the number of connections determined by the determination unit, and transmits the image data generated by the reading unit to the external apparatus.

4. The printing apparatus according to claim 1, further comprising a determination unit configured to determine the number of connections based on a data size of the image data, wherein, in a case where the determination unit determines to use the multi-connection communication function, the communication unit establishes the number of connections determined by the determination unit, and transmits the image data generated by the reading unit to the external apparatus.

5. The printing apparatus according to claim 1, wherein the communication environment includes a transmission rate between the printing apparatus and the external apparatus.

6. A method of controlling a printing apparatus having a multi-connection communication function for transmitting and receiving data blocks by using a plurality of connections, the method comprising:

reading a document to generate image data;

measuring a communication environment between the printing apparatus and an external apparatus;

determining whether to use the multi-connection communication function based on the communication environment measured by the measuring; and transmitting the image data generated by the reading to the external apparatus by using the multi-connection communication function in a case where it is determined that the multi-connection communication function is used, and transmitting the image data generated by the reading to the external apparatus without using the multi-connection communication function in a case where it is determined that the multi-connection communication function is not used, wherein reading the document and measuring the communication environment are performed in parallel, and in a case where the document reading is completed before the measuring of the communication environment is completed, transmitting the generated image data to the external apparatus by using the multi-connection communication function prior to completing the measurement of the communication environment.

7. A non-transitory computer-readable storage medium storing instructions that, when executed by a computer, causes a method for controlling a printing apparatus having a multi-connection communication function for transmitting and receiving data blocks by using a plurality of connections to be executed, the method comprising:

reading a document to generate image data;

measuring a communication environment between the printing apparatus and an external apparatus;

determining whether to use the multi-connection communication function based on the communication environment measured by the measuring; and transmitting the image data generated by the reading to the external apparatus by using the multi-connection communication function in a case where it is determined that the multi-connection communication function is used, and transmitting the image data generated by the reading to the external apparatus without using the multi-connection communication function in a case where it is determined that the multi-connection communication function is not used, wherein reading the document and measuring the communication environment are performed in parallel, and in a case where the document reading is completed before the measuring of the communication environment is completed, transmitting the generated image data to the external apparatus by using the multi-connection communication function prior to completing the measurement of the communication environment.

* * * * *